United States Patent
Domingo et al.

(10) Patent No.: US 11,660,911 B2
(45) Date of Patent: May 30, 2023

(54) PROTECTIVE REINFORCEMENT COMPRISING DIFFERENTIATED LAYERS FOR A PNEUMATIC TIRE FOR A HEAVY-DUTY CIVIL ENGINEERING VEHICLE

(71) Applicant: COMPAGNIE GENERALE DES ETABLISSEMENTS MICHELIN, Clermont-Ferrand (FR)

(72) Inventors: Alain Domingo, Clermont-Ferrand (FR); Cédric Khayat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 347 days.

(21) Appl. No.: 17/048,421

(22) PCT Filed: Apr. 11, 2019

(86) PCT No.: PCT/FR2019/050855
§ 371 (c)(1),
(2) Date: Oct. 16, 2020

(87) PCT Pub. No.: WO2019/202239
PCT Pub. Date: Oct. 24, 2019

(65) Prior Publication Data
US 2021/0162810 A1 Jun. 3, 2021

(30) Foreign Application Priority Data

Apr. 17, 2018 (FR) ..................... 18/53333

(51) Int. Cl.
*B60C 9/20* (2006.01)

(52) U.S. Cl.
CPC ...... *B60C 9/2003* (2013.01); *B60C 2009/208* (2013.01); *B60C 2009/209* (2013.01);
(Continued)

(58) Field of Classification Search
CPC ............... B60C 9/2003; B60C 9/2006; B60C 2009/2016; B60C 2009/2019;
(Continued)

(56) References Cited

U.S. PATENT DOCUMENTS

| | | | |
|---|---|---|---|
| 5,843,583 A | 12/1998 | D'Haene et al. | |
| 2014/0224402 A1* | 8/2014 | Sallaz | B60C 9/22 152/527 |
| 2018/0022157 A1* | 1/2018 | Lardjane | B60C 9/005 152/531 |

FOREIGN PATENT DOCUMENTS

| | | |
|---|---|---|
| EP | 3028873 | 6/2017 |
| WO | WO 2005/014925 | 2/2005 |

(Continued)

*Primary Examiner* — Robert C Dye
*Assistant Examiner* — Sedef E Paquette
(74) *Attorney, Agent, or Firm* — Cozen O'Connor

(57) ABSTRACT

A radial pneumatic tire for a heavy-duty civil engineering vehicle aims to reduce the risk of tread separation of the pneumatic tire, during driving on sharp rocks, while ensuring good resistance to cracking of the crown reinforcement. The pneumatic tire has a protective reinforcement with two protective layers, the radially innermost protective layer having elastic metal reinforcements with a diameter D1 which are axially distributed according to an axial pitch P1, and the radially outermost protective layer has elastic metal reinforcements with a diameter D2 which are axially distributed according to an axial pitch P2. In the tire the following relations are satisfied:

$D1 > D2$ $P1 > P2$ (Continued)

$P1 \geq 1.2*D1$ and $P2 \geq 1.2*D2$ $2.5 \leq (D1*P1)/(D2*P2) \leq 5$.

14 Claims, 1 Drawing Sheet

(52) U.S. Cl.
CPC ............... *B60C 2009/2016* (2013.01); *B60C 2009/2019* (2013.01); *B60C 2009/2077* (2013.01); *B60C 2009/2083* (2013.01); *B60C 2200/065* (2013.01)

(58) Field of Classification Search
CPC .... B60C 2009/2074; B60C 2009/2077; B60C 2009/208; B60C 2009/2083; B60C 2009/209; B60C 2009/2093; B60C 2009/2096; B60C 2200/06; B60C 2200/065
USPC ........................................................ 152/527
See application file for complete search history.

(56) References Cited

FOREIGN PATENT DOCUMENTS

| WO | WO 2007/090603 | 8/2007 | |
|----|----|----|----|
| WO | WO-2016124417 A1 * | 8/2016 | ........... B60C 9/0042 |
| WO | WO 2017/103478 | 6/2017 | |

* cited by examiner

PROTECTIVE REINFORCEMENT COMPRISING DIFFERENTIATED LAYERS FOR A PNEUMATIC TIRE FOR A HEAVY-DUTY CIVIL ENGINEERING VEHICLE

RELATED APPLICATIONS

This is a U.S. National Phase Application under 35 USC 371 of International Application PCT/FR2019/050855 filed on Apr. 11, 2019.

This application claims the priority of French application no. 18/53333 filed Apr. 17, 2018, the entire content of which is hereby incorporated by reference.

The subject matter of the present invention is a radial tire, intended to be fitted to a heavy duty civil engineering type vehicle, and the invention relates more specifically to the crown of such a tire, and more specifically still, to the protective reinforcement thereof.

BACKGROUND OF THE INVENTION

Typically, a radial tire for a heavy duty civil engineering type vehicle, within the meaning of the European Tire and Rim Technical Organization or ETRTO standard, is intended to be mounted on a rim with a diameter at least equal to 25 inches. Although not limited to this type of application, the invention is described for a large radial tire, intended to be mounted on a dumper, a vehicle for transporting materials extracted from quarries or surface mines, by means of a rim with a diameter at least equal to 49 inches, possibly as much as 57 inches, or even 63 inches.

Since a tire has a geometry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane. The circumferential direction is tangential to the circumference of the tire.

In the following text, the expressions "radially inner/radially on the inside" and "radially outer/radially on the outside" mean "closer to" and "further away from the axis of rotation of the tire", respectively. "Axially inner/axially on the inside" and "axially outer/axially on the outside" mean "closer to" and "further away from the equatorial plane of the tire", respectively, with the equatorial plane of the tire being the plane passing through the middle of the tread surface and perpendicular to the axis of rotation.

Generally, a tire comprises a tread intended to come into contact with the ground via a tread surface, the two axial ends of which are connected via two sidewalls to two beads that provide the mechanical connection between the tire and the rim on which it is intended to be mounted.

A radial tire further comprises a reinforcement made up of a crown reinforcement radially on the inside of the tread and of a carcass reinforcement radially on the inside of the crown reinforcement.

The carcass reinforcement of a radial tire for a heavy duty civil engineering type vehicle usually comprises at least one carcass layer comprising generally metal reinforcers coated in a polymeric material of the elastomer or elastomeric type, obtained by blending and called coating compound. A carcass layer comprises a main part that joins the two beads together and is generally wound, in each bead, from the inside of the tire to the outside around a usually metal circumferential reinforcing element known as a bead wire so as to form a turn-up. The metal reinforcers of a carcass layer are substantially mutually parallel and form an angle of between 85° and 95° with the circumferential direction.

The crown reinforcement of a radial tire for a heavy duty civil engineering type vehicle comprises a superposition of circumferentially extending crown layers, radially on the outside of the carcass reinforcement. Each crown layer is made up of generally metal reinforcers that are mutually parallel and are coated in a polymeric material of the elastomer or coating compound type.

Among the crown layers, a distinction is usually made between the protective layers, which make up the protective reinforcement and are radially outermost, and the working layers, which make up the working reinforcement and are comprised radially between the protective reinforcement and the carcass reinforcement.

The protective reinforcement, comprising at least one protective layer, basically protects the working layers from mechanical or physicochemical attacks, which are likely to spread through the tread radially towards the inside of the tire.

The protective reinforcement often comprises two protective layers, which are radially superposed, are formed of elastic metal reinforcers, are mutually parallel within each layer and are crossed from one layer to the next, forming angles at least equal to 10° and at most equal to 35° with the circumferential direction.

The purpose of the working reinforcement, comprising at least two working layers, is to belt the tire and impart stiffness and road holding thereto. It absorbs both mechanical inflation stresses, which are generated by the tire inflation pressure and are transmitted by the carcass reinforcement, and mechanical stresses caused by running, which stresses are generated as the tire runs over the ground and are transmitted by the tread. It also has to withstand oxidation and impacts and puncturing, by virtue of its intrinsic design and that of the protective reinforcement.

The working reinforcement usually comprises two working layers, which are radially superposed, are formed of inextensible metal reinforcers, are mutually parallel within each layer and are crossed from one layer to the next, forming angles at most equal to 60°, and preferably at least equal to 15° and at most equal to 45°, with the circumferential direction.

In order to reduce the mechanical inflation stresses that are transmitted to the working reinforcement, it is known practice to arrange a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement can be positioned radially on the inside of the working reinforcement, between the two working layers of the working reinforcement, or radially on the outside of the working reinforcement.

The hoop reinforcement usually comprises two radially superposed hooping layers formed of elastic metal reinforcers which are mutually parallel within each layer and are crossed from one layer to the next, forming angles at most equal to 10° with the circumferential direction.

As regards the metal reinforcers, a metal reinforcer is mechanically characterized by a curve representing the tensile force (in N) applied to the metal reinforcer as a function of the relative elongation (in %) thereof, known as the force-elongation curve. Mechanical tensile characteristics of the metal reinforcer, such as the structural elongation As (in %), the total elongation at break At (in %), the force at break Fm (maximum load in N) and the breaking strength Rm (in MPa) are derived from this force-elongation curve, with these characteristics being measured in accordance with the 1984 ISO 6892 standard.

The total elongation at break At of the metal reinforcer is, by definition, the sum of the structural, elastic and plastic elongations thereof. (At=As+Ae+Ap). The structural elongation As results from the relative positioning of the metal threads making up the metal reinforcer under a low tensile force. The elastic elongation Ae results from the actual elasticity of the metal of the metal threads making up the metal reinforcer, taken individually, with the behaviour of the metal following Hooke's law. The plastic elongation Ap results from the plasticity, i.e. the irreversible deformation beyond the yield point, of the metal of these metal threads taken individually. These different elongations and the respective meanings thereof, which are well known to a person skilled in the art, are described, for example, in documents U.S. Pat. No. 5,843,583, WO 2005/014925 and WO 2007/090603.

A tensile modulus is also defined, at any point on the force-elongation curve of a metal reinforcer, which modulus is expressed in GPa and represents the gradient of the straight line tangential to the force-elongation curve at this point. In particular, the tensile modulus of the elastic linear part of the force-elongation curve is referred to as the elastic tensile modulus or Young's modulus.

Among the metal reinforcers, a distinction is usually made between the elastic metal reinforcers, such as those used in the protective layers, and the non-extensible or inextensible metal reinforcers, such as those used in the working layers.

An elastic metal reinforcer is characterized by a structural elongation As at least equal to 1% and a total elongation at break At at least equal to 4%. Moreover, an elastic metal reinforcer has an elastic tensile modulus at most equal to 150 GPa, and usually between 40 GPa and 150 GPa.

An inextensible metal reinforcer is characterized by a total elongation At, under a tensile force equal to 10% of the force at break Fm, at most equal to 0.2%. Moreover, an inextensible metal reinforcer has an elastic tensile modulus usually between 150 GPa and 200 GPa.

The inventors have observed that as the tire runs over more or less sharp stones present on the tracks along which dumpers travel, the tread of a tire is frequently subject to cuts that are likely to pass through it radially towards the inside as far as the protective reinforcement, which notoriously slows the spread of the cracks, initiated by the cuts, as far as the working reinforcement. In order to perform this function of slowing cracks, the protective layers are usually made up of elastic metal reinforcers coated in an elastomeric coating compound, offering the advantage of giving the protective reinforcement a certain flexibility, and therefore the ability to deform when running over obstacles such as stones, while at the same time ensuring that the protective reinforcement has sufficient breaking strength.

However, the inventors have observed that, once cuts have appeared in the tread, the latter may separate from the protective reinforcement prematurely. In other words, the protective reinforcement almost entirely blocks the spread of cracks radially towards the inside of the crown reinforcement and allows cracking only at the interface between the tread and the protective reinforcement, potentially leading to premature separation of the tread of the tire, or tread-separation.

The inventors have set themselves the objective, for a radial tire for a heavy duty civil engineering type vehicle, of reducing the risk of tire tread separation following attacks on the tread when running over sharp stones, such as cuts, while at the same time ensuring that the crown reinforcement exhibits good resistance to cracking.

SUMMARY OF THE INVENTION

This objective has been achieved, according to the invention, by a tire for a heavy duty civil engineering type vehicle, comprising a crown reinforcement radially on the inside of a tread and radially on the outside of a carcass reinforcement, the crown reinforcement comprising, radially from the outside to the inside, a protective reinforcement and a working reinforcement, the protective reinforcement comprising two protective layers each comprising elastic metal reinforcers having a tensile elastic modulus at most equal to 150 GPa, coated in an elastomeric material, which are mutually parallel and which form, with a circumferential direction tangential to the circumference of the tire, an angle at least equal to 10° and which are crossed from one protective layer to the next, the radially innermost protective layer having an axial width LP1 and comprising elastic metal reinforcers having a diameter D1 distributed axially with an axial spacing P1, the radially outermost protective layer comprising elastic metal reinforcers having a diameter D2 distributed axially with an axial spacing P2, the working reinforcement comprising two working layers respectively comprising inextensible metal reinforcers having a tensile elastic modulus greater than 150 GPa and at most equal to 200 GPa, coated in an elastomeric material, which are mutually parallel and which form, with the circumferential direction, an angle at least equal to 15° and at most equal to 45° and which are crossed from one working layer to the next, the radially innermost working layer having an axial width LT1 at most equal to the axial width LP1, the respective elastic metal reinforcers of the radially innermost protective layer and of the radially outermost protective layer satisfying the following relationships:

$$D1 > D2$$

$$P1 > P2$$

$$P1 >= 1.2*D1 \text{ and } P2 >= 1.2*D2$$

$$2.5 <= (D1*P1)/(D2*P2) <= 5$$

The inventors, seeking to reduce the risk of tire tread separation, following accidental cuts to the tread, are proposing, in the present invention, a protective reinforcement comprising two protective layers with elastic metal reinforcers that are geometrically differentiated between the two protective layers.

More specifically, the radially innermost protective layer, which protrudes beyond the radially innermost working layer, comprises reinforcers having a diameter D1 greater than the diameter D2 of the reinforcers of the radially outermost protective layer, and which are distributed with an axial spacing P1 greater than the axial spacing P2 separating the reinforcers of the radially outermost protective layer. In other words, the protective reinforcement is made up of a radially innermost protective layer with large-diameter reinforcers and a radially outermost protective layer with small-diameter reinforcers.

A radially outermost protective layer with small-diameter reinforcers makes it possible to prevent the crack, generated by cuts in the tread, from being blocked radially towards the inside of the protective reinforcement. Specifically, reinforcers with too high a diameter, and which are therefore too stiff, encourage the blocking of radial cracking, leading the crack to spread at the radially exterior surface of the radially outermost protective layer, thus generating the formation of pockets of cracking, then causing the pockets of cracking thus formed to join up, potentially ultimately leading to separation between the tread and the protective reinforcement. Selecting a reinforcer diameter that is sufficiently small makes it possible to avoid this disadvantage and allow at least partial radial spreading of the cracks towards the radially innermost protective layer.

Furthermore, a radially innermost protective layer with large-diameter reinforcers makes it possible, on the one hand, to block radial cracking in the direction of the working reinforcement, which is particularly damageable from the viewpoint of the durability of the crown reinforcement and, on the other hand, to compensate for the lower stiffness of the radially outermost protective layer containing smaller reinforcers, and therefore to guarantee that the protective reinforcement has sufficient stiffness overall.

In addition, for each protective layer, the axial spacing between two consecutive reinforcers needs to be greater than 1.2 times the reinforcer diameter, on the one hand in order to guarantee satisfactory bonding, and therefore good anchorage, with the elastomeric compounds radially in contact with the said protective layer, and on the other hand in order to avoid any contact between the reinforcers and, therefore, in order to reduce the associated risk of the spreading of corrosion.

Finally, the ratio $(D1*P1)/(D2*P2)$ between the inter-reinforcement sections respectively $D1*P1$ of the radially innermost protective layer, characterized by a radial thickness $D1$ and an axial width $P1$, and $D2*P2$ of the radially outermost protective layer, characterized by a radial thickness $D2$ and an axial width $P2$, needs to be comprised within a determined range of values. Below the lower end-point of this range of values, which is equal to 2.5, either the risk of cracking at the axial end of the radially innermost protective layer becomes excessively high (in the case where the inter-reinforcement section $D1*P1$ is too small), or the risk of radial cracking spreading through the radially outermost protective layer becomes too high (in the case where the inter-reinforcement section $D2*P2$ is too high). Above the upper end-point of this range of values, which is equal to 5, either the risk of radial cracking spreading through the radially innermost protective layer towards the working reinforcement becomes too high (in the case where the inter-reinforcement section $D1*P1$ is too high), or the spread of cracking at the radially outer surface of the radially outermost protective layer becomes excessively high, with an increased risk of tread-separation (in the case where the inter-reinforcement section $D2*P2$ is too small).

Preferentially, the elastic metal reinforcers of the radially innermost protective layer have a diameter $D1$ at least equal to 3 mm, preferably at least equal to 3.5 mm A minimum diameter $D1$, equal to 3 mm, for the reinforcers of the radially innermost protective layer provides effective blocking of radial cracking in the direction of the working reinforcement and a sufficient overall level of stiffness of the protective reinforcement.

Preferentially also, the elastic metal reinforcers of the radially outermost protective layer have a diameter $D2$ at most equal to 2.5 mm A maximum diameter $D2$, equal to 2.5 mm, for the reinforcers of the radially outermost protective layer makes it possible to completely block radial cracking in the direction of the working reinforcement and therefore block exclusively surface-spreading of cracks that could lead to tire tread separation.

Advantageously, the respective elastic metal reinforcers of the radially innermost protective layer and of the radially outermost protective layer satisfy the relationship: $2.8 <= (D1*P1)/(D2*P2) <= 4.8$. This restricted range of values makes it possible to solve the technical problem addressed even more optimally.

Advantageously also, the elastic metal reinforcers of the radially innermost protective layer are positioned radially, with respect to the elastic metal reinforcers of the radially outermost protective layer, at a radial distance $E$ at least equal to 0.8 mm and at most equal to 2 mm. The radial distance $E$ is the thickness of the elastomeric compound comprised radially between the reinforcers of the radially innermost protective layer and those of the radially outermost protective layer. Below 0.8 mm, this radial distance becomes too small with the risk of leading to contact between respective reinforcers of each protective layer and therefore an increased risk of the spread of corrosion between the two protective layers. Above 2 mm, this radial distance becomes too great with the risk of leading to an increase in temperature of the elastomeric compounds interposed radially between the respective reinforcers of the two protective layers and therefore to potential degradation thereof, something which may lead to the two protective layers separating.

Advantageously, with the radially innermost protective layer having a force at break $Rm1$, the radially innermost protective layer has a force at break $Rm1$ at least equal to 1500 daN/cm. This force at break $Rm1$ of the said protective layer is dependent on the geometric characteristics, such as the diameter $D1$ of the reinforcer and the axial spacing $P1$ between the reinforcers, as well as the breaking strength $Fm1$ of each reinforcer.

Advantageously also, with the radially outermost protective layer having a force at break $Rm2$, the radially outermost protective layer has a force at break $Rm2$ at most equal to 1200 daN/cm. This force at break $Rm2$ of the said protective layer is dependent on the geometric characteristics, such as the diameter $D2$ of the reinforcer and the axial spacing $P2$ between the reinforcers, as well as the breaking strength $Fm2$ of each reinforcer.

According to one preferred embodiment of the elastic metal reinforcers, the elastic metal reinforcers of the protective layers are multistrand ropes of structure $1 \times N$ comprising a single layer of N strands wound in a helix, each strand comprising an internal layer of M internal threads wound in a helix and an external layer of K external threads wound in a helix around the internal layer. This type of structure gives the reinforcer an elastic behaviour as defined hereinabove.

According to a first variant of the preferred embodiment of the elastic metal reinforcers, the single layer of N strands, wound in a helix, comprises $N=3$ or $N=4$ strands, preferably $N=4$ strands.

According to a second variant of the preferred embodiment of the elastic metal reinforcers, the internal layer of M internal threads, wound in a helix, of each strand comprises $M=1, 2, 3, 4$ or 5 internal threads.

For the elastic metal reinforcers of the radially innermost protective layer, the internal layer of M internal threads, wound in a helix, of each strand, preferably comprises M=3 internal threads.

For the elastic metal reinforcers of the radially outermost protective layer, the internal layer of M internal threads, wound in a helix, of each strand, preferably comprises M=1 internal thread.

According to a third variant of the preferred embodiment of the elastic metal reinforcers, the external layer of K external threads, wound in a helix around the internal layer of each strand, comprises K=5, 6, 7, 8, 9, 10 or 11 external threads.

For the elastic metal reinforcers of the radially innermost protective layer, the external layer of K external threads, wound in a helix around the internal layer of each strand, preferably comprises K=8 external threads.

For the elastic metal reinforcers of the radially outermost protective layer, the external layer of K external threads, wound in a helix around the internal layer of each strand, preferably comprises K=5 external threads.

According to one preferred embodiment of the protective layers, the elastic metal reinforcers of the protective layers form an angle at least equal to 15° and at most equal to 35° with the circumferential direction. This is a range of values commonly encountered in the design of protective layers for tires for heavy-duty vehicles of the civil engineering type.

According to one preferred embodiment of the radially innermost protective layer, the elastic metal reinforcers of the radially innermost protective layer form, with the circumferential direction, an angle equal to that formed by the inextensible metal reinforcers of the radially innermost working layer. These angles are oriented in the same direction with respect to the equatorial plane of the tire and are therefore equal in terms of algebraic value. In other words, the reinforcers of the said protective layer are parallel to those of the said working layer, thereby reducing shear, and therefore the risk of cracking, in the vicinity of the axial end of the said working layer.

According to one preferred embodiment of the radially outermost protective layer, the elastic metal reinforcers of the radially outermost protective layer form, with the circumferential direction, an angle equal to that formed by the inextensible metal reinforcers of the radially outermost working layer. These angles are oriented in the same direction with respect to the equatorial plane of the tire and are therefore equal in terms of algebraic value. In other words, the reinforcers of the said protective layer are parallel to those of the said working layer.

According to one preferred embodiment of the crown reinforcement, the radially innermost protective layer has an axial width LP1 at least equal to 1.05 times and at most equal to 1.25 times the axial width LT1 of the radially innermost working layer. Below 1.05 times the axial width LT1, the radially innermost protective layer does not protrude sufficiently with respect to the radially innermost working layer to be able to afford the latter sufficient protection against hammering. Beyond 1.25 times the axial width LT1, the axial end of the radially innermost protective layer is very close to the axial end of the tread, thereby increasing the risk of cracking between the axial end of the said protective layer and the axial end of the tread.

According to one preferred embodiment of the crown reinforcement, the crown reinforcement comprises a hoop reinforcement comprising two hooping layers, of which the respective metal reinforcers, which are coated in an elastomeric material, are mutually parallel and form an angle at most equal to 10° with the circumferential direction, are crossed from one hooping layer to the next. A distinction is usually made between angled hooping layers, with reinforcers that make angles at least equal to 6° and at most equal to 8°, and circumferential hooping layers, with reinforcers that are substantially circumferential making angles close to 0° and at most equal to 5°. The metal reinforcers of the hooping layer may be either elastic or inextensible. The hoop reinforcement can be positioned radially on the inside of the working reinforcement, between the two working layers of the working reinforcement, or radially on the outside of the working reinforcement.

BRIEF DESCRIPTION OF THE DRAWINGS

The embodiments of the invention are illustrated in the schematic FIGS. 1 and 2, which are not to scale, with reference to a tire of size 53180R63.

DETAILED DESCRIPTION OF THE DRAWINGS

Figure 1:
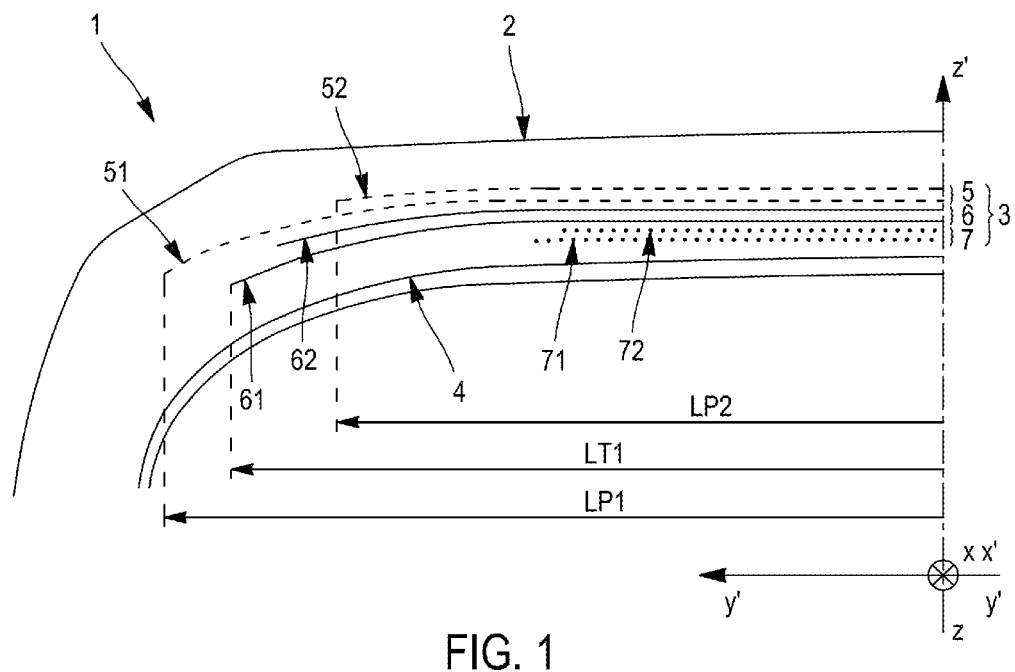
FIG. 1 is a meridian cross section through a crown of a tire for a heavy vehicle of dumper type according to the invention.
Figure 2:
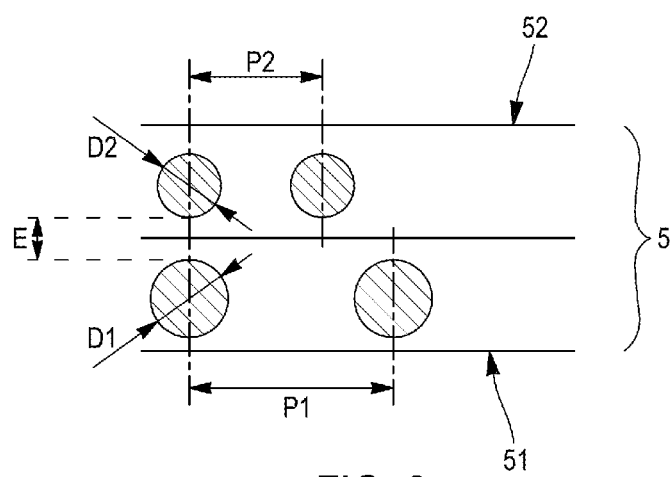
FIG. 2 is a meridian cross section through a portion of protective reinforcement according to the invention.

FIG. 1 shows a meridian cross section through a tire 1 for a heavy-duty vehicle of civil engineering type of size 53/80R63, comprising a crown reinforcement 3 radially on the inside of a tread 2 and radially on the outside of a carcass reinforcement 4. The crown reinforcement 3 comprises, radially from the outside to the inside, a protective reinforcement 5, a working reinforcement 6 and a hoop reinforcement 7. The protective reinforcement 5 comprises two protective layers (51, 52) comprising elastic metal reinforcers that are coated in an elastomeric material, are mutually parallel and form an angle equal to 33° with a circumferential direction XX' tangential to the circumference of the tire, the respective metal reinforcers of each protective layer being crossed from one protective layer to the next. The working reinforcement 6 comprises two working layers (61, 62), of which the respective metal reinforcers, which are inextensible, are coated in an elastomeric material, are mutually parallel and form with the circumferential direction XX' angles respectively equal to 33°, in the case of the radially innermost working layer 61, and 24°, in the case of the radially outermost working layer 62, are crossed from one working layer to the next. The radially innermost protective layer 51 protrudes axially beyond the radially innermost working layer 61, which means to say that the radially innermost protective layer 51 has an axial width LP1 greater than the axial width LT1 of the radially innermost working layer 61. In the case depicted, the axial width LP1 is equal to 1.2 times the axial width LT1. The radially outermost protective layer 52 has an axial width LP2 less than the axial width LP1 of the radially innermost protective layer 51. The hoop reinforcement 7 comprises two hooping layers (71, 72), of which the respective metal reinforcers, which are coated in an elastomeric material, are mutually parallel and form an angle of between 6° and 10° with the circumferential direction XX', are crossed from one hooping layer to the next.

FIG. 1 shows a meridian cross section through a portion of protective reinforcement 5 according to the invention, comprising a radially innermost protective layer 51 and a radially outermost protective layer 52. The radially innermost protective layer 51 comprises large elastic metal reinforcers, having a large diameter D1, advantageously at at least equal to 3 mm, and distributed axially at an axial spacing P1 at least equal to 1.2*D1, the axial spacing being the axial distance between the respective centres of the circular cross sections of two consecutive reinforcers. The radially outermost protective layer 52 comprises small elastic metal reinforcers, having a small diameter D2, advantageously at at most equal to 2.5 mm, and distributed axially at an axial spacing P2 at least equal to 1.2*D2. The inter-reinforcer sections of the radially innermost protective layer 51 and of the radially outermost protective layer, respectively, are respectively equal to D1*P1, D1 being the radial thickness and P1 being the axial width of the section, and to D2*P2, D2 being the radial thickness and P2 being the axial width of the section. Furthermore, the elastic metal reinforcers of the radially innermost protective layer 51 are radially positioned, with respect to the elastic metal reinforcers of the radially outermost protective layer 52, at a radial distance E, advantageously at least equal to 0.8 mm and at most equal to 2 mm.

The inventors have compared a tire according to the invention, I, against a reference tire R, for the tire size 53/80R63.

Table 1 below gives the technical characteristics of the reference tire R and of the tire according to the invention, I, for the size 53/80R63 studied:

TABLE 1

| Crown layers for the size 53/80R63 | Characteristics | Reference tire R | Tire according to the invention I |
|---|---|---|---|
| Radially innermost protective layer 51 | Type of reinforcer R1 | 52.26 = 4*(4 + 9)*26 | 44.35 = 4*(3 + 8)*35 |
| | Tensile elastic modulus M1 of a reinforcer | 100 GPa | 120 GPa |
| | Force at break Fm1 of a reinforcer | 770 daN | 900 daN |
| | Diameter D1 of a reinforcer | 3.1 mm | 3.7 mm |
| | Axial spacing P1 between reinforcers | 3.7 mm | 4.9 mm |
| | Angle A1 of the reinforcers, with respect to XX' | 24° | 33° |
| | Force at break Rm1 of the protective layer | 2081 N/mm | 1836 N/mm |
| | Axial width LP1 of the protective layer | 1120 mm | 1080 mm |
| Radially outermost protective layer 52 | Type of reinforcer R2 | 52.26 = 4*(4 + 9)*26 | 24.26 = 4*(1 + 5)*26 |
| | Tensile elastic modulus M2 of a reinforcer | 100 GPa | 110 GPa |
| | Force at break Fm2 of a reinforcer | 770 daN | 250 daN |
| | Diameter D2 of a reinforcer | 3.1 mm | 1.9 mm |
| | Axial spacing P2 between reinforcers | 3.7 mm | 2.5 mm |
| | Reinforcers angle A2, with respect to XX' | 24° | 33° |
| | Force at break Rm2 of the protective layer | 2081 N/mm | 1000 N/mm |
| | Axial width LP2 of the protective layer | 850 mm | 850 mm |
| Protective reinforcement 5 | Ratio of inter-reinforcer sections D1*P1/D2*P2 | 3.1*3.7/3.1*3.7 = 1 | 3.7*4.9/1.9*2.5 = 3.8 |
| Working reinforcement 6 | Axial width LT1 of the radially innermost working layer 61 | 1000 mm | 950 mm |

So far as the reference tire R is concerned, the radially innermost protective layer has an axial width LP1 equal to 1120 mm, which is 120 mm greater than the axial width LT1 of the radially innermost working layer. The elastic metal reinforcers of the radially innermost protective layer are multistrand cords of structure 52.26, namely made up of N=4 strands, each strand comprising an internal layer of M=4 internal threads and an external layer of K=9 external threads wound in a helix around the internal layer, the threads having a section of diameter d=0.26 mm. In addition, these reinforcers have a tensile elastic modulus M1 equal to 100 GPa, a force at break Fm1 equal to 770 daN, a diameter D1 equal to 3.1 mm, are axially distributed at an axial spacing P1 equal to 3.7 mm, and make an angle A1 equal to 24° with the circumferential direction XX'. The radially outermost protective layer has an axial width LP2 equal to 850 mm and therefore less than the axial width LP1. The elastic metal reinforcers of the radially innermost protective layer are also multistrand cords of structure 52.26, having a tensile elastic modulus M2 equal to 100 GPa, a force at break Fm2 equal to 770 daN, a diameter D2 equal to 3.1 mm, axially distributed at an axial spacing P2 equal to 3.7 mm, and making an angle A2 equal to 24°, and the opposite of the angle A1, with the circumferential direction XX'.

So far as the tire according to the invention I is concerned, the radially innermost protective layer has an axial width LP1 equal to 1080 mm, which is 130 mm greater than the axial width LT1 of the radially innermost working layer. The elastic metal reinforcers of the radially innermost protective layer are multistrand cords of structure 44.35, namely made up of N=4 strands, each strand comprising an internal layer of M=3 internal threads and an external layer of K=8 external threads wound in a helix around the internal layer, the threads having a section of diameter d=0.35 mm. In addition, these reinforcers have a tensile elastic modulus M1 equal to 120 GPa, a force at break Fm1 equal to 900 daN, a diameter D1 equal to 3.7 mm, are axially distributed at an axial spacing P1=4.9 mm, and make an angle A1 equal to 33° with the circumferential direction XX'. The radially outermost protective layer has an axial width LP2 equal to 850 mm and therefore less than the axial width LP1. The elastic metal reinforcers of the radially innermost protective layer are multistrand cords of structure 24.26, namely made up of N=4 strands, each strand comprising an internal layer of M=1 internal thread and an external layer of K=5 external threads wound in a helix around the internal layer, the threads having a section of diameter d=0.26 mm. In addition, these reinforcers have a tensile elastic modulus M2 equal to 110 GPa, a force at break Fm2 equal to 250 daN, a diameter D2 equal to 1.9 mm, are axially distributed at an axial spacing P2 equal to 2.5 mm, and make an angle A2 equal to 33°, and the opposite of the angle A1, with the circumferential direction XX'.

The characteristics of the tire according to the invention I do indeed meet the essential conditions of the invention:

D1, equal to 3.7 mm, is greater than D2, equal to 1.9 mm,
P1, equal to 4.9 mm, is greater than P2, equal to 2.5 mm,
P1 is equal to 1.32 times D1, therefore greater than 1.2 times D1,
P2 is equal to 1.32 times D2, therefore greater than 1.2 times D2,
the ratio D1*P1/D2*P2 is equal to 3.8, and therefore comprised between 2.5 and 5.

The inventors have demonstrated, through experimental running via the client base, that the life of the tire according to the invention I, before being removed from the vehicle, was increased by approximately 10% with respect to that of the reference tire R.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy duty civil engineering type vehicle, comprising: a crown reinforcement radially on the inside of a tread and radially on the outside of a carcass reinforcement:

the crown reinforcement comprising, radially from the outside to the inside, a protective reinforcement and a working reinforcement, the protective reinforcement comprising two protective layers each comprising elastic metal reinforcers having a tensile elastic modulus at most equal to 150 GPa, coated in an elastomeric material, which are mutually parallel and which form, with a circumferential direction (XX') tangential to the circumference of the tire, an angle at least equal to 10° and which are crossed from one protective layer to the next, the radially innermost protective layer having an axial width LP1 and comprising elastic metal reinforcers having a diameter D1 at least equal to 3 mm and distributed axially with an axial spacing P1, the radially outermost protective layer comprising elastic metal reinforcers having a diameter D2 distributed axially with an axial spacing P2, the working reinforcement comprising two working layers respectively comprising inextensible metal reinforcers having a tensile elastic modulus greater than 150 GPa and at most equal to 200 GPa, coated in an elastomeric material, which are mutually parallel and which form, with the circumferential direction (XX), an angle at least equal to 15° and at most equal to 45° and which are crossed from one working layer to the next, the radially innermost working layer having an axial width LT1 at most equal to the axial width LP1, wherein the respective elastic metal reinforcers of the radially innermost protective layer and of the radially outermost protective layer satisfy the following relationships:

$$D1 > D2$$

$$P1 > P2$$

$$P1 >= 1.2*D1 \text{ and } P2 >= 1.2*D2$$

$$2.5 <= (D1*P1)/(D2*P2) <= 5.$$

2. The tire according to claim 1, wherein the elastic metal reinforcers of the radially outermost protective layer have a diameter D2 at most equal to 2.5 mm.

3. The tire according to claim 1, wherein the respective elastic metal reinforcers of the radially innermost protective layer and of the radially outermost protective layer satisfy the relationship: $2.8 <= (D1*P1)/(D2*P2) <= 4.8$.

4. The tire according to claim 1, wherein the elastic metal reinforcers of the radially innermost protective layer are radially positioned, with respect to the elastic metal reinforcers of the radially outermost protective layer, at a radial distance E at least equal to 0.8 mm and at most equal to 2 mm.

5. The tire according to claim 1, wherein the radially innermost protective layer has a force at break Rm1 at least equal to 1500 daN/cm.

6. The tire according to claim 1, wherein the radially outermost protective layer has a force at break Rm2 at most equal to 1200 daN/cm.

7. A tire for a heavy duty civil engineering type vehicle, comprising: a crown reinforcement radially on the inside of a tread and radially on the outside of a carcass reinforcement:

the crown reinforcement comprising, radially from the outside to the inside, a protective reinforcement and a working reinforcement, the protective reinforcement comprising two protective layers each comprising elastic metal reinforcers having a tensile elastic modulus at most equal to 150 GPa, coated in an elastomeric material, which are mutually parallel and which form, with a circumferential direction (XX') tangential to the circumference of the tire, an angle at least equal to 10° and which are crossed from one protective layer to the next, the radially innermost protective layer having an axial width LP1 and comprising elastic metal reinforcers having a diameter D1 distributed axially with an axial spacing P1, the radially outermost protective layer comprising elastic metal reinforcers having a diameter D2 distributed axially with an axial spacing P2, the working reinforcement comprising two working layers respectively comprising inextensible metal reinforcers having a tensile elastic modulus greater than 150 GPa and at most equal to 200 GPa, coated in an elastomeric material, which are mutually parallel and which form, with the circumferential direction (XX'), an angle at least equal to 15° and at most equal to 45° and which are crossed from one working layer to the next, the radially innermost working layer having an axial width LT1 at most equal to the axial width LP1, wherein the respective elastic metal reinforcers of the radially innermost protective layer and of the radially outermost protective layer satisfy the following relationships:

$D1 > D2$ $P1 > P2$ $P1 >= 1.2*D1$ and $P2 >= 1.2*D2$ $2.5 <= (D1*P1)/(D2*P2) <= 5$, wherein the elastic metal reinforcers of the protective layers are multistrand ropes of structure 1×N comprising a single layer of N strands wound in a helix, each strand comprising an internal layer of M internal threads wound in a helix and an external layer of K external threads wound in a helix around the internal layer.

8. The tire according to claim 7, wherein the single layer of N strands, wound in a helix, comprises N=3 or N=4 strands.

9. The tire according to claim 7, wherein the internal layer of M internal threads, wound in a helix, of each strand comprises M=1, 2, 3, 4 or 5 internal threads.

10. The tire according to claim 9, wherein, for the elastic metal reinforcers of the radially innermost protective layer, the internal layer of M internal threads, wound in a helix, of each strand, comprises M=3 internal threads.

11. The tire according to claim 9, wherein, for the elastic metal reinforcers of the radially outermost protective layer, the internal layer of M internal threads, wound in a helix, of each strand, comprises M=1 internal thread.

12. The tire according to claim 7, wherein the external layer of K external threads, wound in a helix around the internal layer of each strand, comprises K=5, 6, 7, 8, 9, 10 or 11 external threads.

13. The tire according to claim 12, wherein, for the elastic metal reinforcers of the radially innermost protective layer, the external layer of K external threads, wound in a helix around the internal layer of each strand, comprises K=8 external threads.

14. The tire according to claim 12, wherein, for the elastic metal reinforcers of the radially outermost protective layer, the external layer of K external threads, wound in a helix around the internal layer of each strand, comprises K=5 external threads.

* * * * *